Figure 3:

July 3, 1934.   G. A. LYON   1,965,531
PROCESS OF MAKING CORRUGATED SHOVE-DOWN TIRE COVERS
Filed Oct. 2, 1931   2 Sheets-Sheet 1
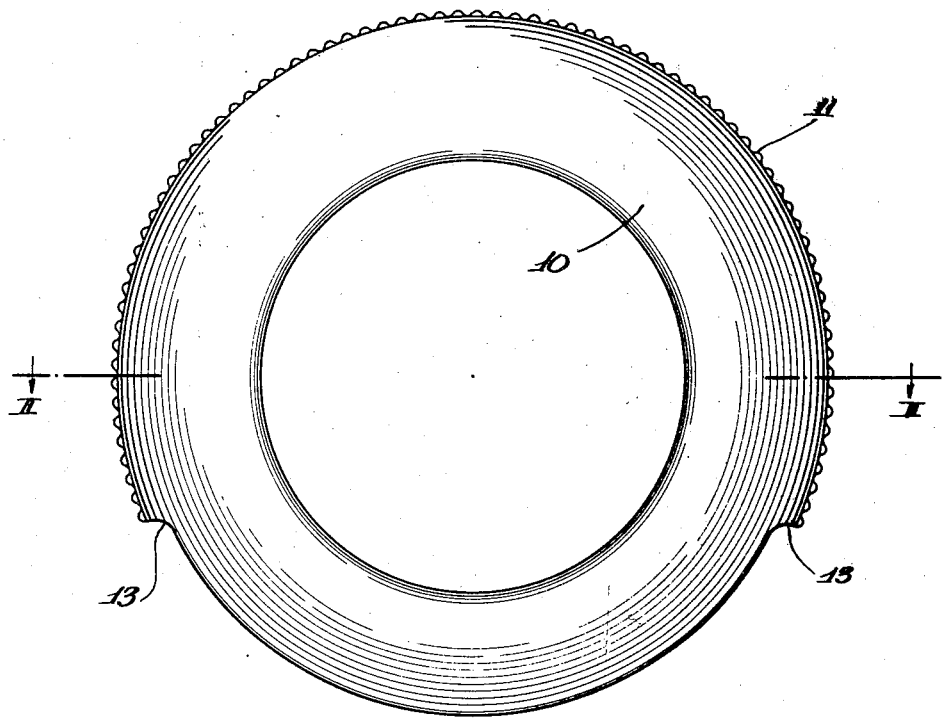
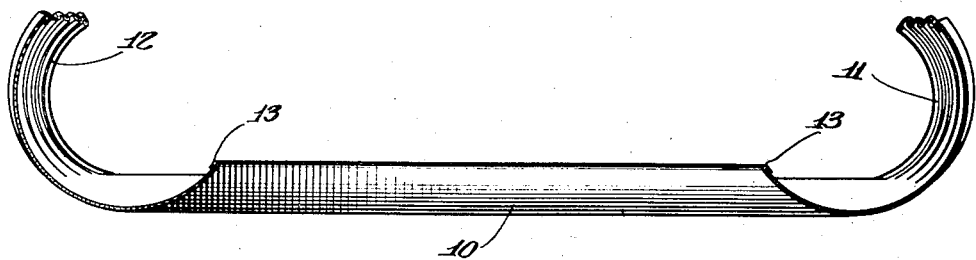
Inventor:
George Albert Lyon.
by: [signature] Attys.

Patented July 3, 1934

1,965,531

UNITED STATES PATENT OFFICE 1,965,531

PROCESS OF MAKING CORRUGATED SHOVE-DOWN TIRE COVERS

George Albert Lyon, Allenhurst, N. J., assignor to Lyon Incorporated, Asbury Park, N. J., a corporation of Delaware Application October 2, 1931, Serial No. 566,451

8 Claims. (Cl. 113—116)

This invention relates to metallic tire covers and more particularly to a single piece unitary metallic tire cover as well as to a novel method of manufacturing the same.

It is the object of this invention to provide an improved, simplified single piece unitary metallic tire cover as well as a novel and economical method of manufacturing the same.

Another object of the invention is to provide a method of manufacturing tire covers involving simplified steps and whereby the cover may be punched and completely formed from a single sheet of material.

In accordance with the general features of this invention there is provided a single piece metallic tire cover including a side portion for disposition over an outer side wall of the spare tire and a flexible peripheral portion for disposition over the outer periphery or tread of the tire the former of which portions is adapted to be blanked from a single sheet of material and the latter of which portions is adapted to be thereafter formed from the blank so formed.

Another feature of the invention relates to the corrugating of the peripheral or rim portion of the cover so as to provide the same with flexibility whereby the cover may be readily flexed into proper tire protecting position on the tire.

Other objects and features of this invention will more fully appear from the following detailed description taken in connection with the accompanying drawings which illustrate a single embodiment thereof and in which Figure 1 is a side elevation of the tire cover embodying the features of this invention;

Figure 2 is a horizontal cross sectional view taken on the line II—II of Figure 1 looking downwardly, and Figures 3, 4, 5, 6, and 7 are views of the cover in the different stages of its manufacture in accordance with the method involving my present invention.

The cover of my invention is illustrated in Figures 1 and 2 and includes a side portion 10 for disposition over an outer side wall of a spare tire and a peripheral or rim portion 11 for disposition over the tread or outer periphery of the tire. These two portions are integral since the tire cover is made from a single piece of material. The material used may be of any suitable thin sheet material such for example as metallic sheet. Further it is to be noted that the peripheral portion 11 is provided with a plurality of transverse corrugations which corrugations are of greatest depth at their outermost extremities. These corrugations are indicated by the reference character 12.

The peripheral portion 11 does not extend clear around the plate portion 10 but is cut off at the point 13 indicated in Figure 1 so that the lower part of the cover includes only the downwardly projecting side portion 10. This construction enables the cover to be shoved downwardly into proper tire protecting position on a spare tire such for example as the spare tire mounted in a fenderwell of an automotive vehicle. Moreover the corrugations 12 in the peripheral portion 11 provide the same with flexibility so that the peripheral portion will expand upon being pushed over the tire and will thereafter contract to retain the cover in proper tire protecting position on the tire.

The peripheral portion 11 is of concavo-convex cross section and of such width that when the cover is on a spare tire the rear edge of this portion will extend inwardly from the outermost periphery of the tire to an extent sufficient to enable it to hold the cover on the tire against lateral displacement.

If it is desired additional clamping means may be used in the form of a suitable clamping arm or strap to secure the cover in place according to the requirements of the user.

In Figures 3 to 7 inclusive I have illustrated the various stages involved in the manufacture of my tire cover in accordance with the method of my invention.

In the first step of the method the square sheet of sheet material such for example as metallic sheet is subjected to a punch press operation whereby a ring-like depression 15 is formed in the sheet 16 as shown in Figure 3.

Figure 4:
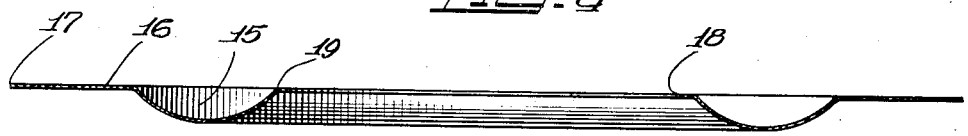

In the second step of the operation the corners of the square sheet are cut off so as to provide the same with a circular outer edge 17 as shown in Figure 4.

Also at the same time that the corners of the sheet are cut off a central ring-like disc may be punched from the plate 16 so as to provide a circular opening designated by the reference numeral 18 leaving a ring-like flange 19 adjacent the depression 15.

Figure 5:
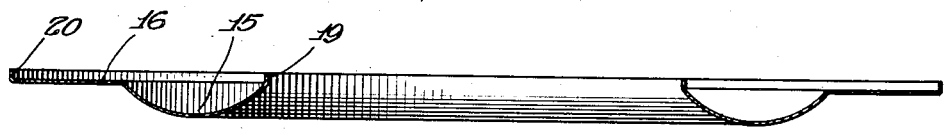

In the next step of the process illustrated in Figure 5 the ring-like flange 19 is bent upwardly as is also the outermost edge of the plate designated by the reference numeral 20.

Figure 6:
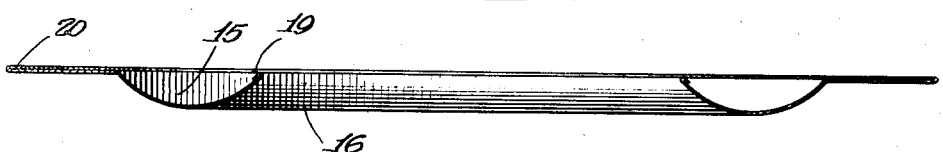
Figure 7:
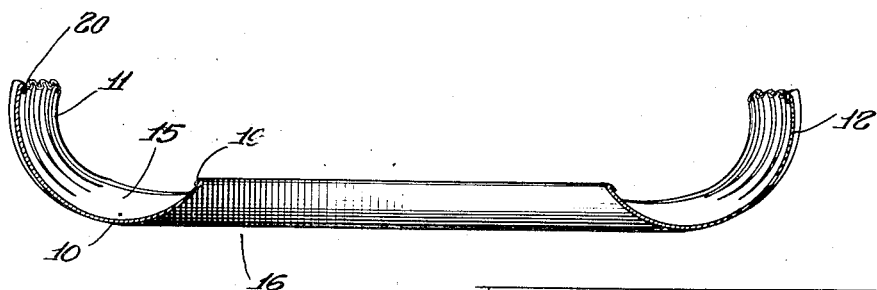

Nextly the two upwardly bent flanges 19 and 20 are bent downwardly over the adjoining portions of the plate as shown in Figure 6 to form doubled back edges.

In the final operations involved in the manufacture of my cover the outer peripheral or marginal portion of the ring-like plate 16 is bent upwardly and inwardly so as to define the peripheral or tread covering portion 11 of the cover. This bending operation may be accomplished either by a punch press operation, by a spinning operation or the like. After this outer peripheral portion of the plate is bent into the form shown in Figure 7 so as to define the peripheral portion 11 of the cover the same may be suitably corrugated to provide the corrugations previously described in connection with Figures 1 and 2 and designated by the reference character 12. Also preferably before the portion 11 of the cover is formed a part of this outer portion of the ring-like cover may be cut away at the points indicated at 13 in Figure 1 so that the lower part of the cover does not include a peripheral portion.

It will of course be appreciated that when the cover is completely fabricated the depression 15 previously described constitutes the outer side wall portion 10 of the cover and the upwardly and inwardly bent peripheral part of the ring-like plate constitutes the corrugated peripheral portion 11 of the cover.

Now it is of course understood that although I have described in detail the preferred embodiment of my invention the invention is not to be thus limited but only insofar as defined by the scope and spirit of the appended claims.

I claim as my invention:

1. The process of manufacturing a single piece unitary tire cover from a single sheet of material which consists in stamping a ring-like depression in the material to define the side portion of the cover, punching out the center of the sheet to form a ring-like piece, nextly forming the outer margin of the ring-like piece inwardly and outwardly into a discontinuous tread covering or peripheral portion of the cover, and corrugating said latter portion of the cover.

2. The process of manufacturing a single piece unitary tire cover from a single sheet of material which consists in first forming a ring-like member from said sheet which member has a ring-like depression thereon corresponding to the side portion of the cover for disposition over a side wall of a spare tire, then forming the outer margin of said member inwardly and outwardly into the tread covering portion of the cover, and corrugating said latter portion.

3. The process of manufacturing a single piece unitary tire cover from a single sheet of material which consists in first forming a ring-like member from said sheet which member has a ring-like depression thereon corresponding to the side portion of the cover for disposition over a side wall of a spare tire and then curving the outer margin of said member laterally into a discontinuous tread covering portion of concavo-convex cross section.

4. The process of manufacturing a spare tire cover from sheet material which consists in channeling the sheet to form a concavo-convex portion for disposition over an outer side wall of a spare tire and then corrugating a margin of the sheet adjacent the channeled portion into an inwardly turned tread covering portion transversely curved to form with the concavo-convex portion a cover having a substantially continuous transverse curvature with corrugations which are of progressive increasing depth from said concavo-convex portion toward the rear edge of the inwardly turned tread covering portion.

5. The process of manufacturing a spare tire cover from sheet material which consists in channeling one portion of the sheet and corrugating an adjoining portion to form said portions into tire tread and side wall covering sections with the corrugated portion transversely curved to continue the transverse curvature of the cover from the channel portion and having corrugations of progressively increasing depth.

6. The process of manufacturing a spare tire cover from sheet material which consists in channeling one portion of the sheet and corrugating an adjoining portion to form said portions into tire tread and side wall covering sections, and then providing said tread section with an open bottom to enable shoving of the cover over and onto the tire.

7. The process of manufacturing a spare tire cover from sheet material which consists in channeling the sheet into concavo-convex cross-section of such shape as to conform with the peripheral contour of a spare tire and corrugating such channeled sheet to provide the same with sufficient flexibility to enable the ready application of the cover to the tire and with the corrugated portion transversely curved and having corrugations of progressively increasing depth.

8. The process of manufacturing a spare tire cover from sheet material which consists in channeling the sheet to form a concavo-convex portion for disposition over an outer side wall of a spare tire, curving a margin of the sheet adjoining the channeled portion to form a tire tread covering portion and providing said tread covering portion with an open bottom to enable the shoving of the cover over and onto the tire.

GEORGE ALBERT LYON.